United States Patent
Moore, III et al.

(10) Patent No.: US 8,249,835 B2
(45) Date of Patent: *Aug. 21, 2012

(54) 3-D CASINO GAMING FLOOR VISUALIZATION UTILIZING REAL-TIME AND BATCH DATA

(75) Inventors: Joseph R. Moore, III, Reno, NV (US); Daniel G. Carlson, Henderson, NV (US); Brian V. Gress, Henderson, NV (US); William C. Little, Las Vegas, NV (US); Javier A. Saenz, Reno, NV (US); Andrew George Novotak, Jr., Reno, NV (US)

(73) Assignee: IGT, Reno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,656

(22) Filed: Oct. 25, 2011
(Under 37 CFR 1.47)

(65) Prior Publication Data

US 2012/0040756 A1    Feb. 16, 2012

Related U.S. Application Data

(63) Continuation of application No. 12/397,260, filed on Mar. 3, 2009, now Pat. No. 8,073,657.

(51) Int. Cl.
*G06F 17/50* (2006.01)
(52) U.S. Cl. .............. 703/1; 463/9; 463/32; 434/72
(58) Field of Classification Search .... 703/1; 463/9–13, 463/25, 30–32, 42; 434/72
See application file for complete search history.

(56) References Cited

U.S. PATENT DOCUMENTS

| | | |
|---|---|---|
| 6,871,194 B1 | 3/2005 | Cardno |
| 6,884,170 B2 | 4/2005 | Rowe |
| 6,972,757 B2 | 12/2005 | Arikawa et al. |
| 7,300,352 B2 | 11/2007 | Rowe |
| 7,480,857 B2 | 1/2009 | Benbrahim et al. |
| 7,753,789 B2 | 7/2010 | Walker et al. |
| 8,073,657 B2 | 12/2011 | Moore, III et al. |
| 2002/0152120 A1 | 10/2002 | Howington |
| 2005/0153778 A1 | 7/2005 | Nelson et al. |
| 2006/0063594 A1 | 3/2006 | Benbrahim et al. |
| 2006/0211493 A1 | 9/2006 | Walker et al. |
| 2006/0252530 A1 | 11/2006 | Oberberger et al. |
| 2007/0004506 A1 | 1/2007 | Kinsley et al. |
| 2007/0026935 A1 | 2/2007 | Wolf et al. |
| 2007/0026942 A1 | 2/2007 | Kinsley et al. |
| 2007/0060363 A1 | 3/2007 | Nguyen et al. |
| 2007/0087834 A1 | 4/2007 | Moser et al. |
| 2008/0138773 A1 | 6/2008 | Lathrop |
| 2008/0261699 A1 | 10/2008 | Topham et al. |
| 2008/0263088 A1 | 10/2008 | Webster et al. |
| 2009/0054139 A1 | 2/2009 | Anderson |
| 2009/0055205 A1 | 2/2009 | Nguyen et al. |

(Continued)

OTHER PUBLICATIONS

U.S. Appl. No. 12/205,646, filed Sep. 5, 2008, Saenz et al.

(Continued)

*Primary Examiner* — Russell Frejd
(74) *Attorney, Agent, or Firm* — Weaver, Austin, Villeneuve & Sampson, LLP

(57) ABSTRACT

An integrated computing device (tool) and method is disclosed, for creating a casino gaming floor layout, analyzing the layout from the simulated point of view of a patron within the floor, and assessing the performance of the layout in real time or with historical data.

14 Claims, 11 Drawing Sheets

U.S. PATENT DOCUMENTS

| | | |
|---|---|---|
| 2009/0093300 A1 | 4/2009 | Lutnick et al. |
| 2009/0172035 A1 | 7/2009 | Lessing et al. |
| 2009/0239667 A1 | 9/2009 | Rowe et al. |
| 2009/0265105 A1 | 10/2009 | Davis et al. |
| 2010/0048302 A1 | 2/2010 | Lutnick et al. |
| 2010/0062838 A1 | 3/2010 | Nguyen et al. |
| 2010/0228526 A1 | 9/2010 | Moore, III et al. |

OTHER PUBLICATIONS

US Office Action dated May 6, 2011 issued in U.S. Appl. No. 12/397,260.

US Notice of Allowance and Notice of Allowability dated Sep. 9, 2011 issued in U.S. Appl. No. 12/397,260.

Lucas et al., (Jun. 2004) "Evaluating Slot Machine Performance: A Performance-Potential Model", *International Journal of Hospitality Management*, 23(2):103-121.

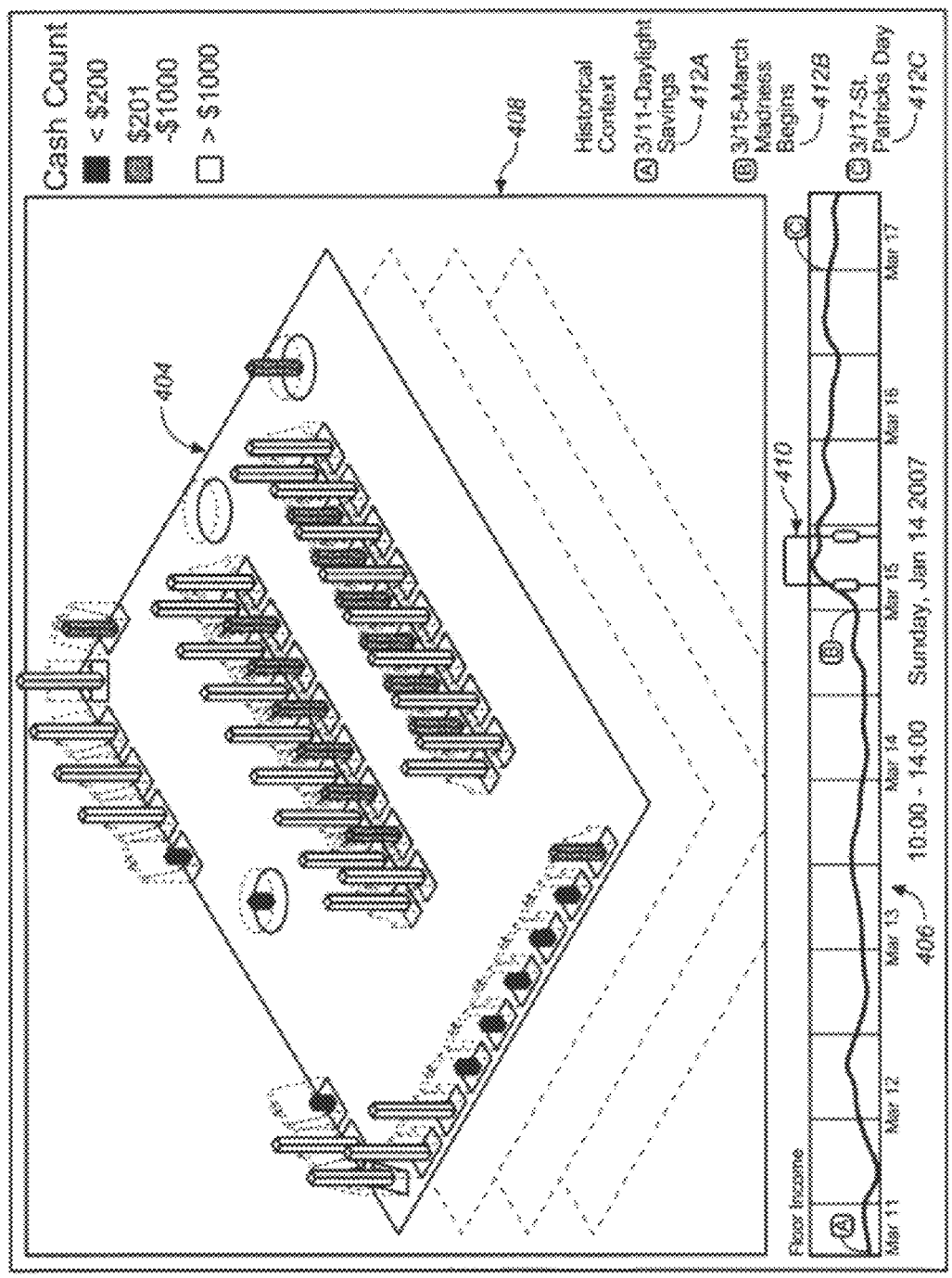

3-D CASINO GAMING FLOOR VISUALIZATION UTILIZING REAL-TIME AND BATCH DATA

CROSS REFERENCES TO RELATED APPLICATION

This application is a continuation of and claims priority under section 35 U.S.C. 120 to U.S. patent application Ser. No. 12/397,260, entitled 3-D CASINO GAMING FLOOR VISUALIZATION UTILIZING REAL-TIME AND BATCH DATA filed on Mar. 3, 2009, issued as U.S. Pat. No. 8,073,657, the entire disclosure of which is hereby incorporated by reference in its entirety into the present patent application for all purposes.

FIELD OF THE INVENTION

The present invention relates generally to layout and performance analysis of a casino gaming floor and the devices therein.

BACKGROUND OF THE INVENTION

A modern casino is a fully networked environment where the games and even the tables contain computing devices. Optimizing the performance of the equipment is essential to maximize return on very significant investment in hardware and real estate. Often times in a casino a person may have no idea that a game or other attraction of interest lies just around the corner.

Additionally, as a game machine can now be reconfigured to play different games by configuring the machine over the network, many aspects of the gaming environment can be reconfigured. Efficiently laying out the gaming floor, and understanding the impact and consequences of various arrangements and configurations aids in maximization of both patron enjoyment and casino revenue.

SUMMARY OF THE INVENTION

Embodiments relate to an integrated computing device (tool) and method for creating a floor layout, analyzing the layout from the simulated point of view of a patron within the floor, and assessing the performance of a layout in real time or with historical data.

One aspect relates to a casino management device that comprises a group of one or more computers configured to layout a floorplan of a casino gaming floor and to create a 3 dimensional model of at least two different types of casino gaming machines or tables. The device is further configured to create a 3 dimensional model of one or more types of casino game tables, allow a user to place the 3 dimensional models of the casino gaming machines and game tables within the floorplan of the casino gaming floor, and render a 3 dimensional model of the floorplan with the gaming machines and game tables in two dimensions for a two dimensional display. The user may also manipulate a point of view within the rendered 3 dimensional model such that the point of view is at a viewing height less than a height of at least one gaming machine or game table and the point of view allows for line of sight view between a simulated viewpoint of a patron and at least one gaming machine or game table.

The device is further configured to access performance data of physical gaming machines and game tables on the casino floor, correlate the performance data of a physical gaming machine or game table with a model of the physical machine or table, correlate the performance data of the physical gaming machine or game table with the location of the machine or table within the floorplan of the casino gaming floor, and render a model of the casino gaming floor showing the performance of a selection of correlated gaming machines and game tables with a graphical representation of the performance, each graphical representation displayed at the location of the physical gaming machine within the casino gaming floor.

Another aspect relates to a method for optimizing the placement and productivity of wager based games. The method comprises creating a three dimensional model of at least two different types of casino gaming machines or game tables, allowing a user to place the 3 dimensional models of the casino gaming machines and game tables within a layout of the casino gaming floor, and rendering a 3 dimensional model of the layout with the gaming machines and game tables in two dimensions for a two dimensional display.

The method further comprises manipulating a point of view within the rendered 3 dimensional model such that the point of view is at a viewing height less than a height of at least one gaming machine or game table and the point of view allows for a line of sight view between rendered items within the casino gaming floor.

In addition, the method allows for accessing performance data of physical gaming machines and game tables on the casino floor, correlating the performance data of a physical gaming machine or game table with a model of the physical machine or table, and correlating the performance data of the physical gaming machine or game table with the location of the machine or table within the created layout of the casino gaming floor. As such the a model of the casino gaming floor can then be rendered showing the performance of a selection of correlated gaming machines and game tables with a graphical representation of the performance, each graphical representation displayed at the location of the physical gaming machine within the casino gaming floor.

This allows for a large amount of data to be easily absorbed by the operator, and for a user to select his criteria of choice to be displayed. The graphical nature of the data, and its display at the location of the gaming machine, especially when rendered in 3D allows for rapid tracking of the performance of various iterations of designs.

These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed layout and management systems and methods. These drawings in no way limit any changes in form and detail that may be made to the invention by one skilled in the art without departing from the spirit and scope of the present invention.

FIG. 4A depicts three dimensional rendering of configurable performance metrics at gaming machine locations.

DESCRIPTION OF THE PREFERRED EMBODIMENTS

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Figure 1:
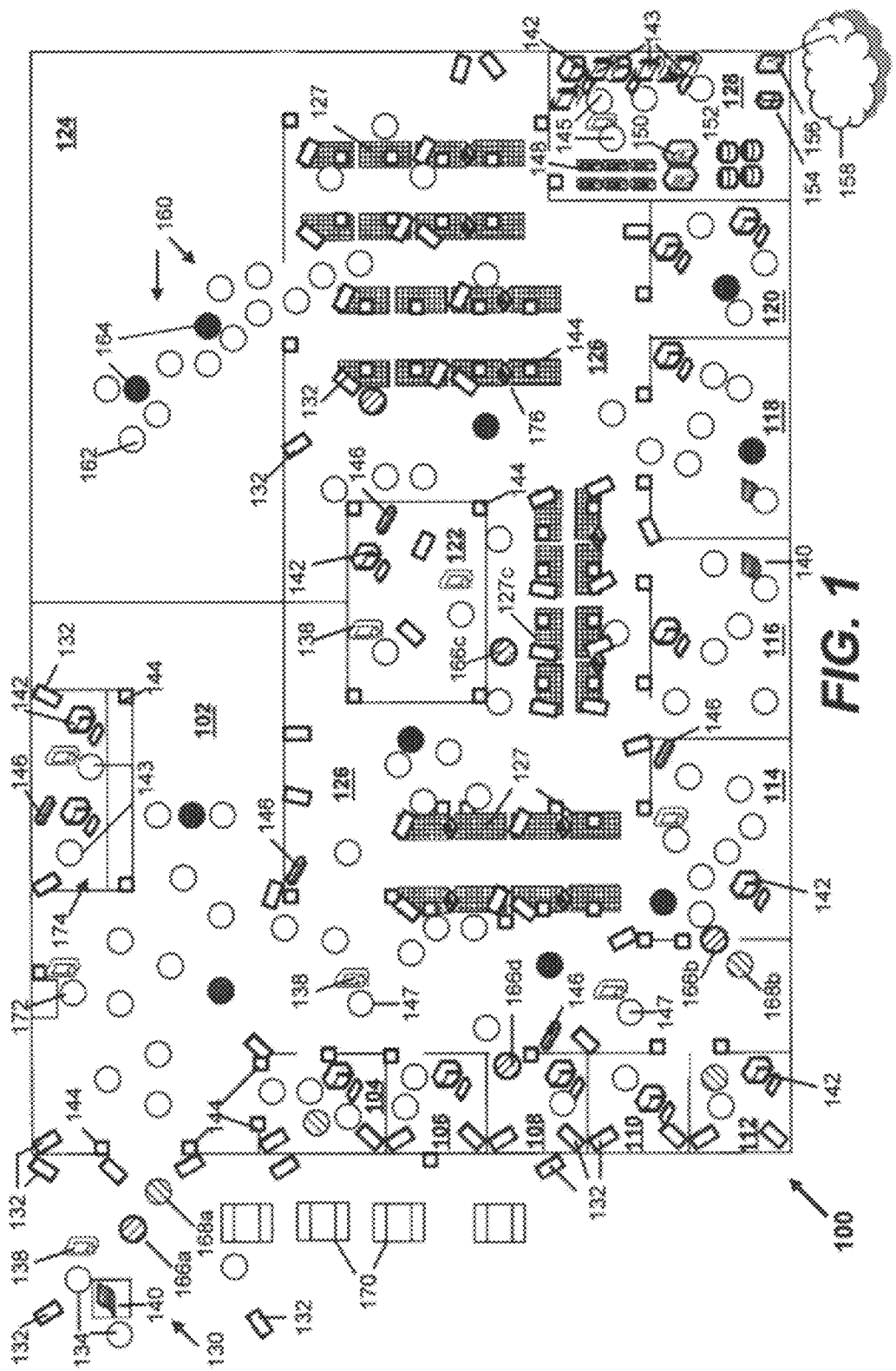
FIG. 1 depicts a simplified example of a gaming establishment and related devices that may be used for some implementations of the invention.

FIG. 1 depicts a simplified example of a casino configured for implementing some aspects of the invention. In this example, gaming establishment 100 includes valet area 130, lobby 102 and nearby shops 104, 106, 108, 110 and 112. These shops may include a range of retail establishments, including but not limited to souvenir shops, jewelry stores, clothing stores and the like. Food and beverage establishments 114, 116, 118 and 120 may include restaurants, sushi bars, buffets, or any such dining and/or drinking establishment.

Bar 122 is an island in the midst of the main casino/gaming area 126 that includes various gaming machines 127. Preferably, at least some of gaming machines 127 are configured for communication with other devices, including but not limited to one or more of servers 148, in order to provide various features discussed elsewhere herein. Auditorium 124 includes a stage and seating (not shown) for live performances. At the moment indicated in FIG. 1, a number of patrons 160 are exiting auditorium 124.

Operators 145 and various devices for providing services and managing gaming establishment 100 may be seen in control room 128. This area includes host devices 142 to facilitate the communication of operators 145 with various other devices, such as other host devices 142 (which may serve as cash registers, hotel registration terminals, etc.), PDAs 138, laptops 140, gaming machines 127, etc. Host devices 142 may comprise desktop computers, laptops, workstations, or other such devices. Operators 145 may also communicate with other people, including but not limited to casino personnel 147, via PDAs 138, telephones, etc.

Host devices 142 (and other devices, as needed) are also configured for communication with servers 148, computing devices 150, storage devices 152 and external network 158, via gateway 154 and firewall 156. Network 158 is the Internet in this example, but may be one or more public or private networks. According to some implementations of the invention, additional storage devices and related devices may be accessed via network 158, e.g., a storage area network ("SAN") or other types of network storage.

Control room 128 includes a plurality of monitors 143 for, inter alia, receiving image data from cameras 132. Cameras 132 may include, for example, "smart cameras," closed circuit television ("CCTV") cameras, closed circuit digital photography ("CCDP") cameras, range cameras and/or webcams. Accordingly, the image data displayed on monitors 143 may include still digital images, video feeds, freeze-frames, etc. Such image data may be used for various purposes, including not only security purposes known in the art but also some implementations of the present invention.

Servers 148 and/or computing devices 150 may be configured to perform various functions, including but not limited to real-time player tracking and/or player loyalty functions, patron identification functions (including but not limited to biometric functions such as facial recognition functions), patron location functions, licensing, gaming, accounting, security services, etc. These functions may include those known in the art and those specific to the present invention. At least some of servers 148 may be configured for communication with cameras 132 and other devices, in order to provide real-time player tracking functionality and other methods described herein.

Relevant information is set forth in U.S. patent application Ser. No. 11/225,407, by Wolf et al., entitled "METHODS AND DEVICES FOR MANAGING GAMING NETWORKS" and filed Sep. 12, 2005; in U.S. patent application Ser. No. 10/757,609 by Nelson et al., entitled "METHODS AND APPARATUS FOR GAMING DATA DOWNLOADING" and filed on Jan. 14, 2004; in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, issued as U.S. Pat. No. 7,480,857; in U.S. patent application Ser. No. 11/225,337 by Nguyen et al., filed Sep. 12, 2005 and entitled "DISTRIBUTED GAME SERVICES"; and in U.S. patent application Ser. No. 11/173,442 by Kinsley et al., filed Jul. 1, 2005 and entitled "METHODS AND DEVICES FOR DOWNLOADING GAMES OF CHANCE," issued as U.S. Pat. No. 7,972,214; all of which are hereby incorporated by reference in their entirety and for all purposes. Some examples of gaming networks and devices are set forth below.

Example Gaming Establishment Systems

Embodiments of the present invention are used to layout a casino floor and network of gaming devices, described below.

Figure 2:
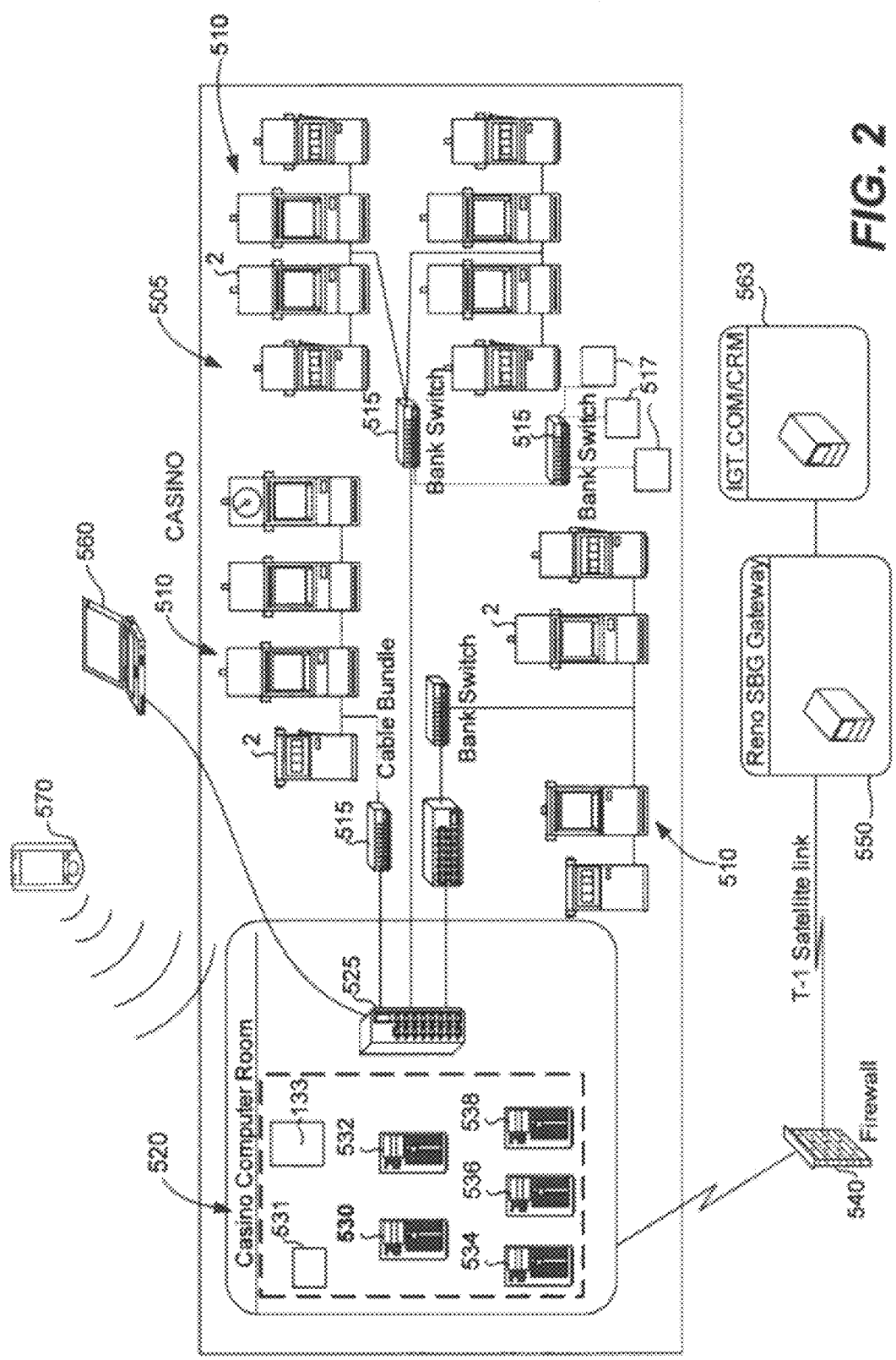
FIG. 2 illustrates a gaming network that may be used for some implementations of the invention.

One example of a network topology is shown in FIG. 2. Those of skill in the art will realize that this exemplary architecture and the related functionality are merely examples and that the present invention encompasses many other such embodiments and methods. Here, for example, a single gaming establishment 505 is illustrated, which is a casino in this example. However, it should be understood that some implementations of the present invention involve multiple gaming establishments.

Gaming establishment 505 includes 16 gaming machines 2, each of which is part of a bank 510 of gaming machines 2. In this example, gaming establishment 505 also includes a bank of networked gaming tables 517. It will be appreciated that many gaming establishments include hundreds or even thousands of gaming machines 2 and/or gaming tables 517, not all of which are included in a bank. However, the present invention may be implemented in gaming establishments having any number of gaming machines, gaming tables, etc.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 525, which combines switching and routing functionality in this example) and/or the inclusion of other network devices not shown in FIG. 2. For example, some implementations of the invention include one or more middleware servers disposed between gaming machines 2 and server 530. Such middleware servers can provide various useful functions, including but not limited to the filtering and/or aggregation of data received from bank switches 515, from individual gaming machines and from other player terminals. Some implementations of the invention include load balancing methods and devices for managing network traffic.

Each bank 510 has a corresponding bank switch 515, which may be a conventional bank switch. Each bank switch is connected to server-based gaming ("SBG") server 530 via main network device 525, which combines switching and routing functionality in this example.

Although various floor communication protocols may be used, some preferred implementations use the Game to System or "G2S" protocol. The GS2 protocol combines features of IGT's open, Ethernet-based SuperSAS® protocol and the Best of Breed ("BOB") protocol, either of which may also be used to implement various aspects of SBG. IGT has also developed a gaming-industry-specific transport layer called CASH that rides on top of TCP/IP and offers additional functionality and security.

SBG server 530, License Manager 531, Arbiter 133, servers 532, 534, 536 and 538, and main network device 525 are disposed within computer room 520 of gaming establishment 505. In practice, more or fewer servers may be used. Some of these servers may be configured to perform tasks relating to player loyalty and/or player tracking, bonusing/progressives, etc. Some servers may be configured to perform tasks specific to the present invention. License Manager 531 may also be implemented, at least in part, via a server or a similar device. Some exemplary operations of License Manager 531 are described in detail in U.S. patent application Ser. No. 11/225, 408, entitled "METHODS AND DEVICES FOR AUTHENTICATION AND LICENSING IN A GAMING NETWORK" by Kinsley et al., issued as U.S. Pat. No. 8,152,628; which is hereby incorporated by reference.

SBG server 530 can also be configured to implement, at least in part, various aspects of the present invention. Some preferred embodiments of SBG server 530 and the other servers shown in FIG. 2 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 531, servers 532, 534, 536 and 538, and main network device 525) are mounted in a single rack with SBG server 530. Accordingly, many or all such devices will sometimes be referenced in the aggregate as an "SBG server." However, in alternative implementations, one or more of these devices is in communication with SBG server 530 and/or other devices of the network but located elsewhere. For example, some of the devices could be mounted in separate racks within computer room 520 or located elsewhere on the network. For example, it can be advantageous to store large volumes of data elsewhere via a storage area network ("SAN").

In some embodiments, these components are SBG server 530 preferably has an uninterruptible power supply ("UPS"). The UPS may be, for example, a rack-mounted UPS module.

Computer room 520 may include one or more operator consoles or other host devices that are configured for communication with SBG server 530. Such host devices may be provided with software, hardware and/or firmware for implementing various aspects of the invention; many of these aspects involve controlling SBG server 530. However, such host devices need not be located within computer room 520. Wired host device 560 (which is a laptop computer in this example) and wireless host device 570 (which is a PDA in this example) may be located elsewhere in gaming establishment 505 or at a remote location. Accordingly, one or more devices in casino 505 may be configured for communication with locations not limited to those indicated in FIG. 2, e.g., via the Internet or another convenient network.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948, 387, entitled "METHODS AND APPARATUS FOR NEGOTIATING COMMUNICATIONS WITHIN A GAMING NETWORK" and filed Sep. 23, 2004 (the "Arbiter Application"), issued as U.S. Pat. No. 8,015,595, which is incorporated herein by reference and for all purposes. In some preferred implementations, Arbiter 133 is a repository for the configuration information required for communication between devices on the gaming network (and, in some implementations, devices outside the gaming network).

Casino Layout and Performance Tracking

Optimizing the layout of a casino floor and the performance of the equipment on the floor is an important aspect of maximizing return on very significant investment in gaming assets and real estate. Efficiently laying out the gaming floor, and understanding the impact and consequences of various arrangements and configurations aids in maximization of both patron enjoyment and casino revenue.

Figure 3A:
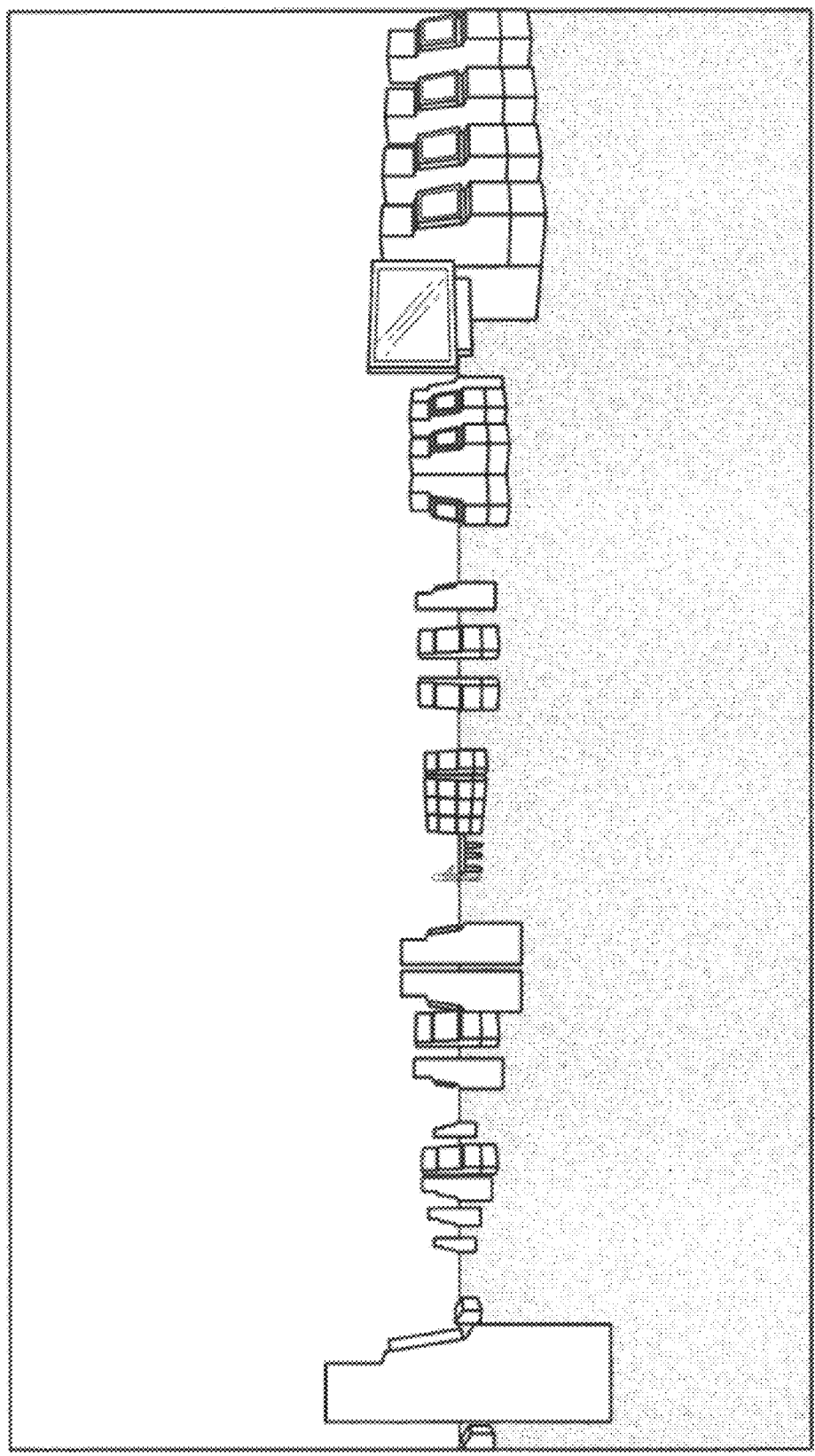
FIG. 3A is a simplified example of a 3D rendering of some casino games.

Embodiments of the invention allow a user to create a three dimensional model of a casino floor layout, as seen in FIG. 3A. This is done using a computing device comprising a microprocessor, random access memory, a non volatile mass storage device, and various input output devices such as a monitor, D-pad, joystick, keyboard, mouse and the like. The microprocessor may be special purpose graphics processing unit ("GPU") or may be used in conjunction with a GPU. The computing device may in certain embodiments be networked to a casino gaming network such as that show in FIG. 2 and described above. When used to layout the machines it is networked to, the device can automatically determine the identity of all the various electronic gaming machines and other networked devices, along with the configuration of the devices. The computing device can instantly gain access to this information by querying the network. Having instant access to this often rapidly changing information is advantageous and facilitates accurate and rapid layout.

In one embodiment, the computing device is a gaming machine as described above. This allows utilization of the graphics capability of the machine and an available joystick allows for natural manipulation and travel through a three dimensional rendering.

The layout may be created from scratch or may use a CAD file as an input. In either case, the layout requires no knowledge of CAD programs, and is easy enough that a person not skilled in CAD can layout the floor.

Because the model is three dimensional (although rendered in two dimensions) the point of view can be manipulated so that it is within the three dimensional model. One particularly advantageous viewpoint is at the sight level of a patron on the floor (below the top of many machines and other viewing obstacles). This enables the user to have a patron's line of sight view and to see and track what the patron would see if walking through the facility. This allows more optimal placement of games/tables, collectively "gaming devices" in order to attract patrons. For example, if a patron might be interested in playing a particular type of game, but cannot see the game, the opportunity for both the patron and the casino may be lost. The game of interest may even be quite close to the patron, but because it is out of the line of sight, the patron may never know about it. Given advanced player tracking techniques and systems, it is known what type and groups of games a player may be interested in with a relatively high degree of accuracy. Thus, the present invention capitalizes on that knowledge, by allowing iterations of casino floor designs to be made and the performance tracked over time, as described below.

Figure 3B:
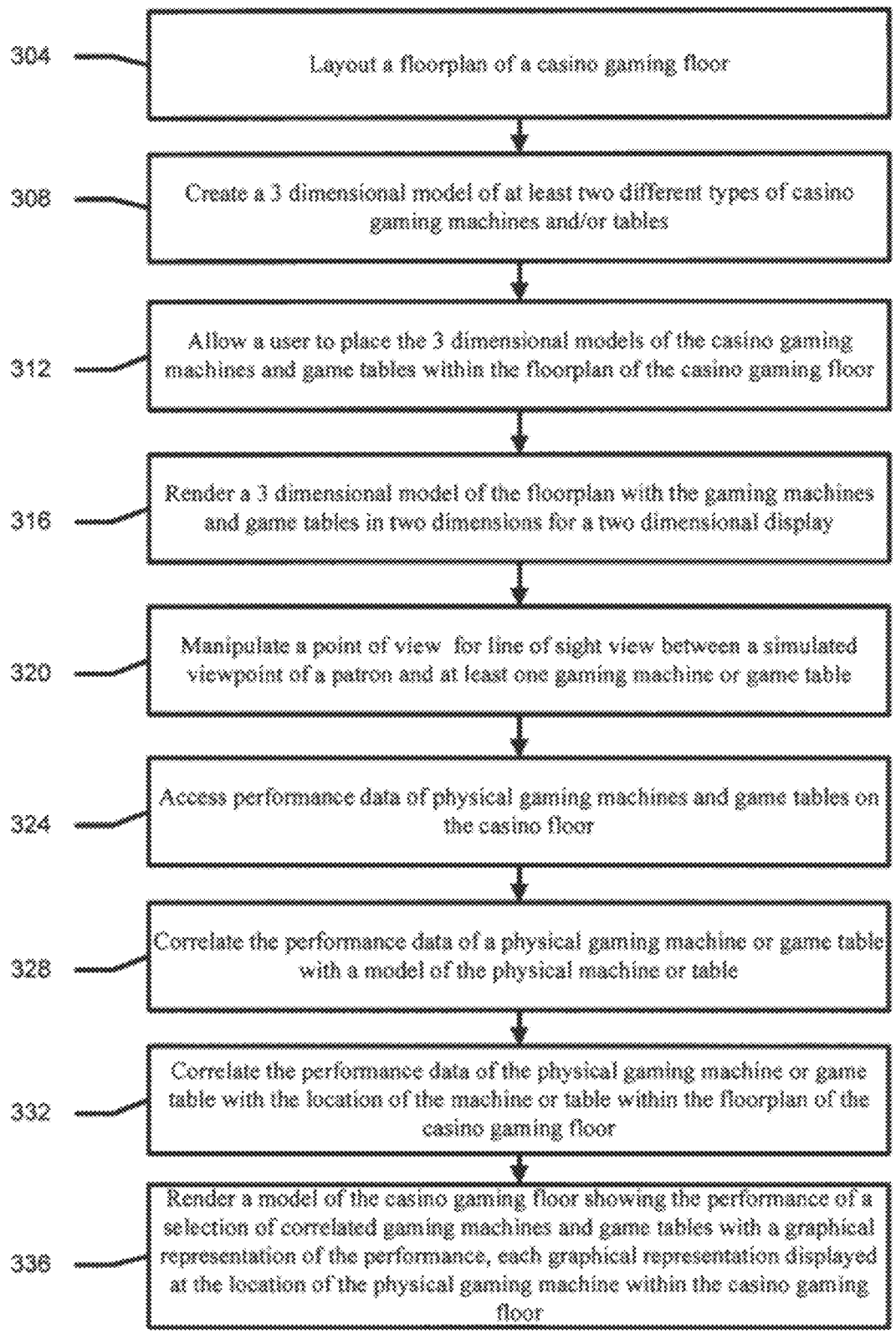
FIG. 3B is a flow chart illustrating an embodiment of casino layout and performance tracking.

FIG. 3B is a flow chart illustrating an embodiment of casino layout and performance tracking.

In step 304, a user of the system creates a layout or floorplan of a casino gaming floor. As mentioned above, this can be made from scratch or by inputting previously designed building or floor plans from CAD as a basis. Next, in step 308, the user and system create a 3 dimensional model of the gaming machines, tables, and other infrastructure present on and part of the floor.

The system then allows the user to place the 3 dimensional models of the casino gaming machines and game tables etc. within the floorplan in step 312. Then, the system renders a 3 dimensional model of the floorplan with the gaming machines and game tables in two dimensions for a two dimensional display. This rendering of course continues when the user manipulates a point of view within the rendered 3 dimensional model. Notably, the user can see the point of view of a patron walking between banks of games, tables and other infrastructure of the casino floor, which allows for line of sight view between patron and at least one gaming machine or game table. A user can also move between such a point of view and a birds eye view rendered in three dimensions, which is very helpful in a contextual analysis.

Next, in step 324, the system may then access performance data/metrics of physical gaming machines and game tables on the casino floor. Examples of these metrics will be discussed below. This may be done through an interface such as that shown in FIG. 5. This data may be real time data and/or historical data. Then, in steps 328 and 332, the performance data for each gaming device is correlated with its virtual model and location within the floor. In step 336, the system then renders a model of the casing floor showing the performance of a selection of correlated gaming machines and game tables with a graphical representation of the performance. Each graphical representation is displayed at the location of the physical gaming machine within the casino gaming floor. This correlation between the location on the floor and performance is easily accessible to any casino operator and provides much information at a glance, with further information available as one drills down on a particular device or group of devices for more detailed analysis.

A number of painting/analyzer/color ramp indexed reports may be provided. A color ramp or index is created to provide the user a quick understanding of a metric as it relates to the actual drawing of the casino and gaming assets on the floor. This can include value fields as well as small sets of attributes where the index display is not too large. For all gaming assets that are color ramped or painted to the floor, any asset has the capability to drill down into the distinct asset's individual information. If an asset is on the map a right click by the user will produce a standard condensed dashboard of performance in a representative dialogue box.

Figure 4B:
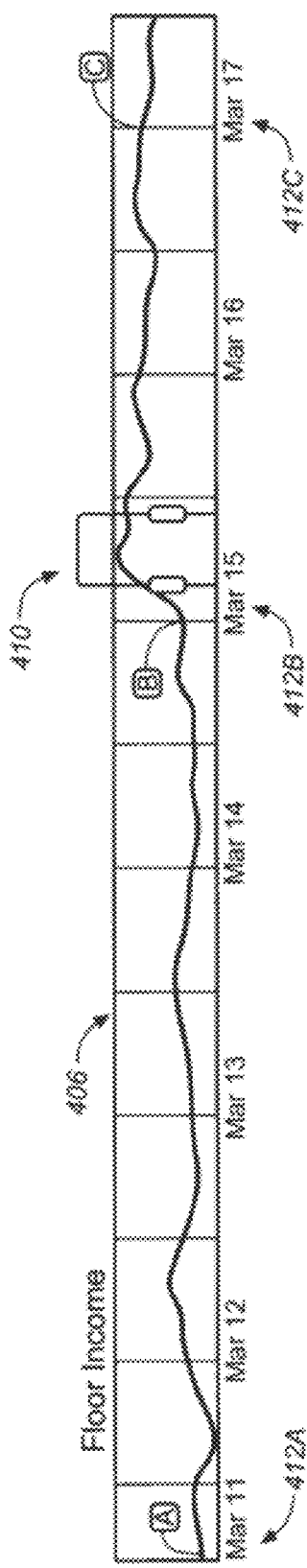
FIG. 4B illustrates a graph of a performance metric over time.

Some example metrics that may be displayed either graphically or accompany a graphic in text form are listed below:

Historical Timecode Painting in a current and time series format
    Categorized Values
        Numeric Classification, Equal Interval, Quantile, Natural Breaks (Jenks)
    CoinIn Color Ramp
    Denominations Color Ramp
    Display Type
    Game Type
    Manufacturers
    Metered Win Color Ramp
    Occupancy Percentage
    Time-code Toolbar for time series and playing individual instances between two points in time
    Configure DB Text Placement Automatically with specific emphasis on legibility for diagonal and 'tight' fitting machines.
    Download Canned DB Text
    Control/Introduce Canned Analyzers @ Corp
    Support Historical Timecode DB Text Updating
    Bank Average Coin In
    Bank Average Metered Win
    Slot Denominations
    Machine Location
    Machine Number
    Player Occupancy
    Slot Coin In
    Slot Par
    Slot Metered Win FIG. 4A depicts a selected performance metric "cash count" 402 for each gaming device on the floor. Three dimensional geometric figures are shown at the location of each machine in 3-D graph/floor 404. A graph 406 of another selected metric, in this example "floor income" is shown over time. The user can select context markers to display on the timeline of graph 406. Historical context markers 412A, 412B, and 412C are also shown in FIGS. 4A and 4B. In this example, marker 412A indicates daylight savings time; marker 412B indicates when March Madness began; and marker 412C is St. Patrick's day. An adjustable time window 410 can be manipulated to show a median, average, high or low value for one or more performance metrics within the window. The widow may also function as a rolling window that moves over time to follow real time data or as directed by the user.

Figure 4C:
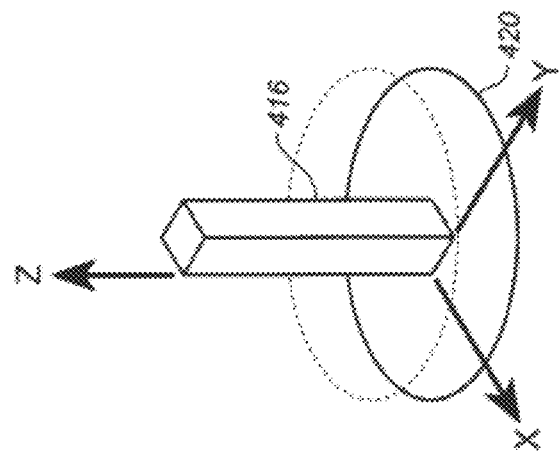
FIG. 4C illustrates a graphical performance marker for a particular machine.

FIG. 4C illustrates a graphical performance marker for a particular machine. The marker comprises geometric shape 416 and base 420. The shape, color, transparency, height, width, and depth of the geometric shape may each independently be associated with different performance metrics. Likewise, the same characteristics of base 420 may also be associated with various performance metrics.

This graphical layout of both gaming devices and performance metrics of the devices can also be utilized to conduct predictive modeling. For example, a designer may create a physical layout and configure what games may be downloaded to various devices. Based on prior performance data accessed from databases, "what if" performance scenarios can be developed. Using a visual display, a designer or operator may drag and drop an icon representing a gaming device type onto a machine where a player is playing, and see the performance combination of the particular player, game, and location. For further detail on predictive modeling, please refer to U.S. patent application Ser. No. 12/205,646 to Javier Saenz, entitled "Predictive Modeling in a Gaming System," which is hereby incorporated by reference in the entirety.

Figure 5:
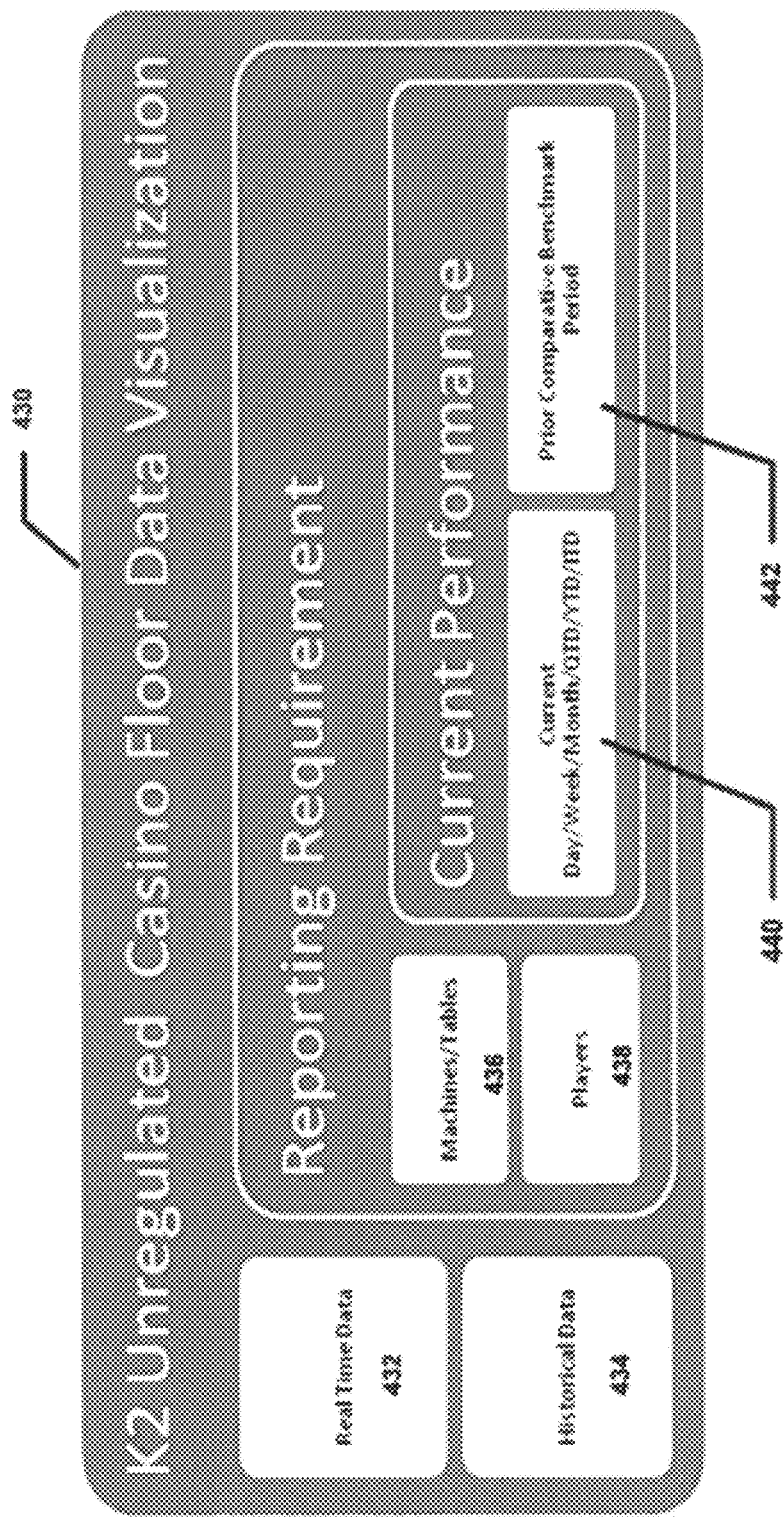
FIG. 5 illustrates an interface for performance analysis.

FIG. 5 illustrates an interface for performance analysis. A user may select to analyze real time data, using button 432 or historical data using button 434. Data may also be analyzed in terms of machines/tables with button 436 or players with button 438. Current performance by day/week/month quarter to date/year to date etc. may be graphed and analyzed with button 440, as can a prior comparative benchmark period using button 442.

Figure 6A:
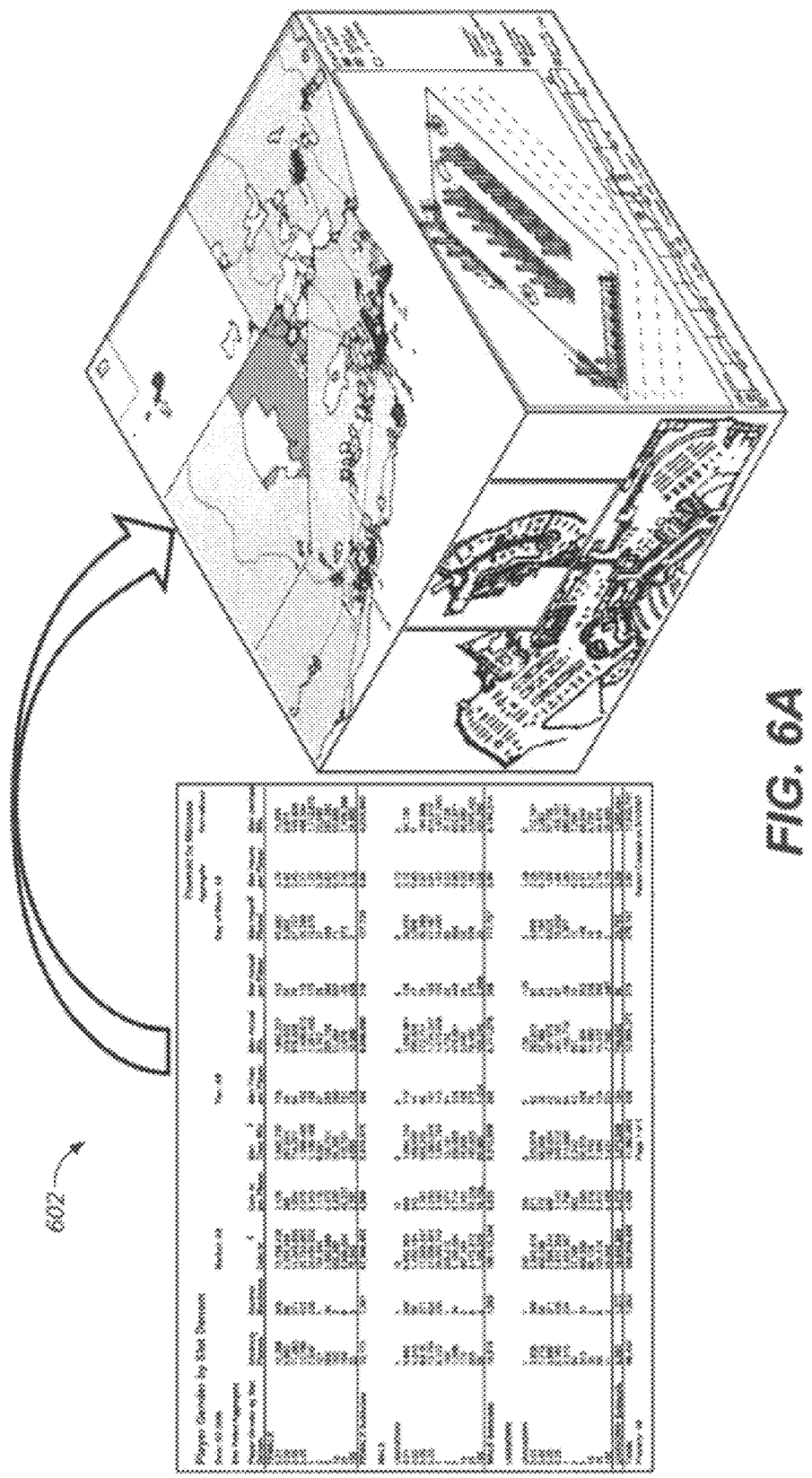
FIGS. 6A and 6B illustrate an example of graphical performance depiction.
Figure 6B:
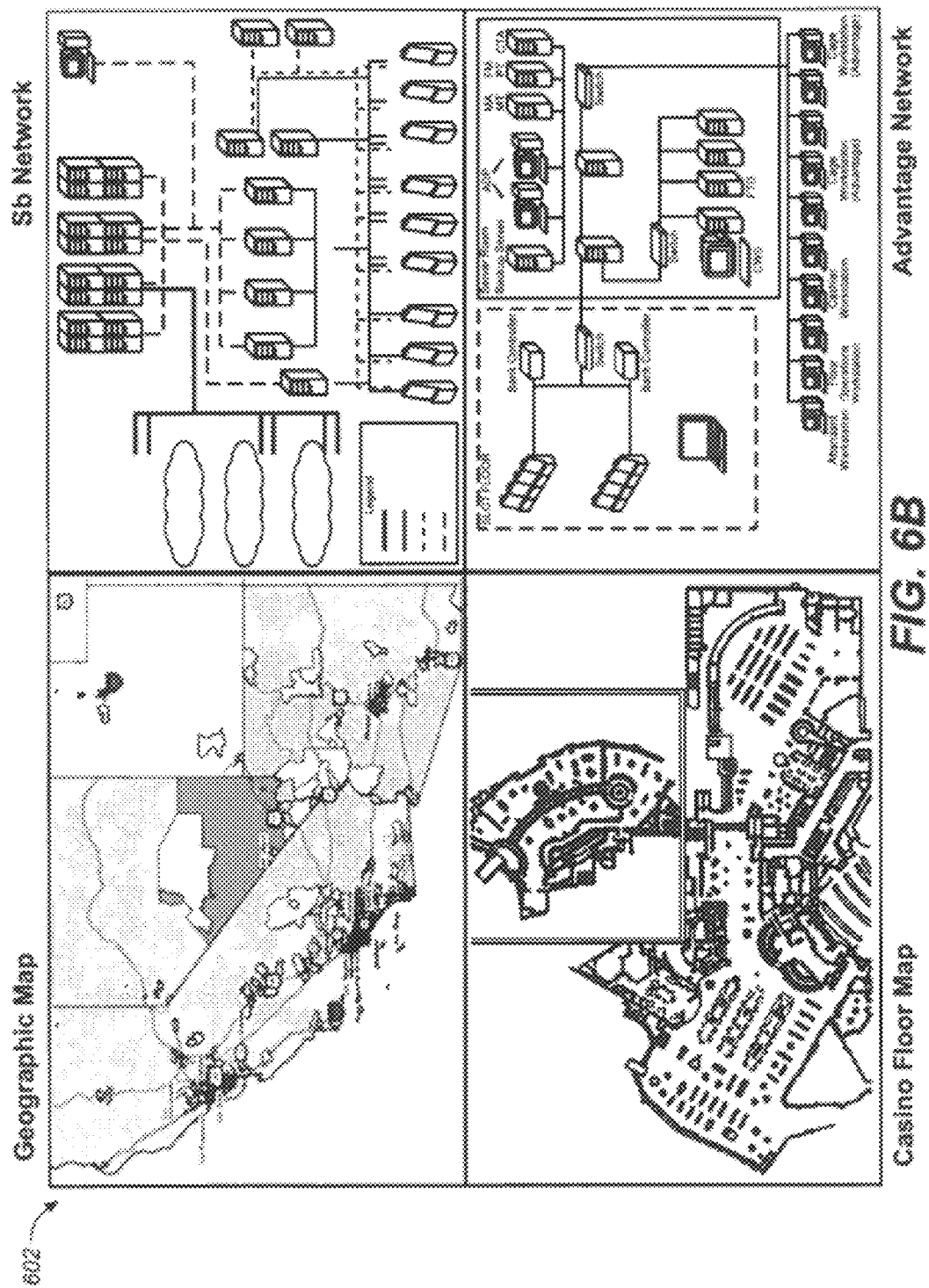

FIGS. 6A and 6B illustrate example data presentation formats that allow rapid uptake and understanding of performance data. FIG. 6A illustrates how standard data in row and column format may be transformed and presented in a graphical format. Note that the three dimensional layout shown in FIGS. 4A and 4B is shown on one face in FIG. 6A. Performance metrics over a region (geographic map) may also be selected, analyzed, and displayed, along with a casino floor map, and various networks within one or more casinos, for example.

Figure 7A:
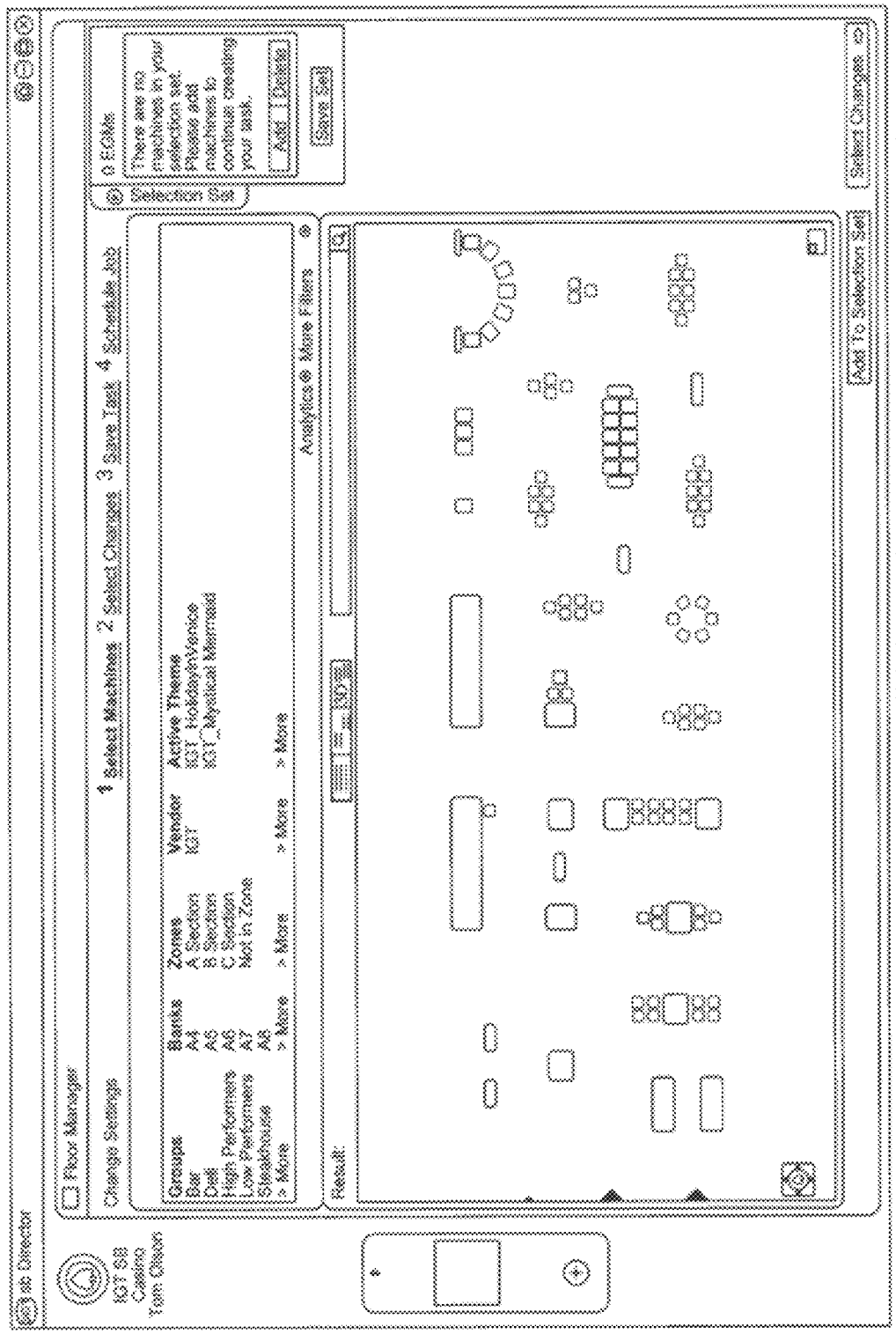
FIG. 7A illustrates a casino floor layout and FIG. 7B illustrates the layout with the assets indicating a level of performance for a selected metric.
Figure 7B:
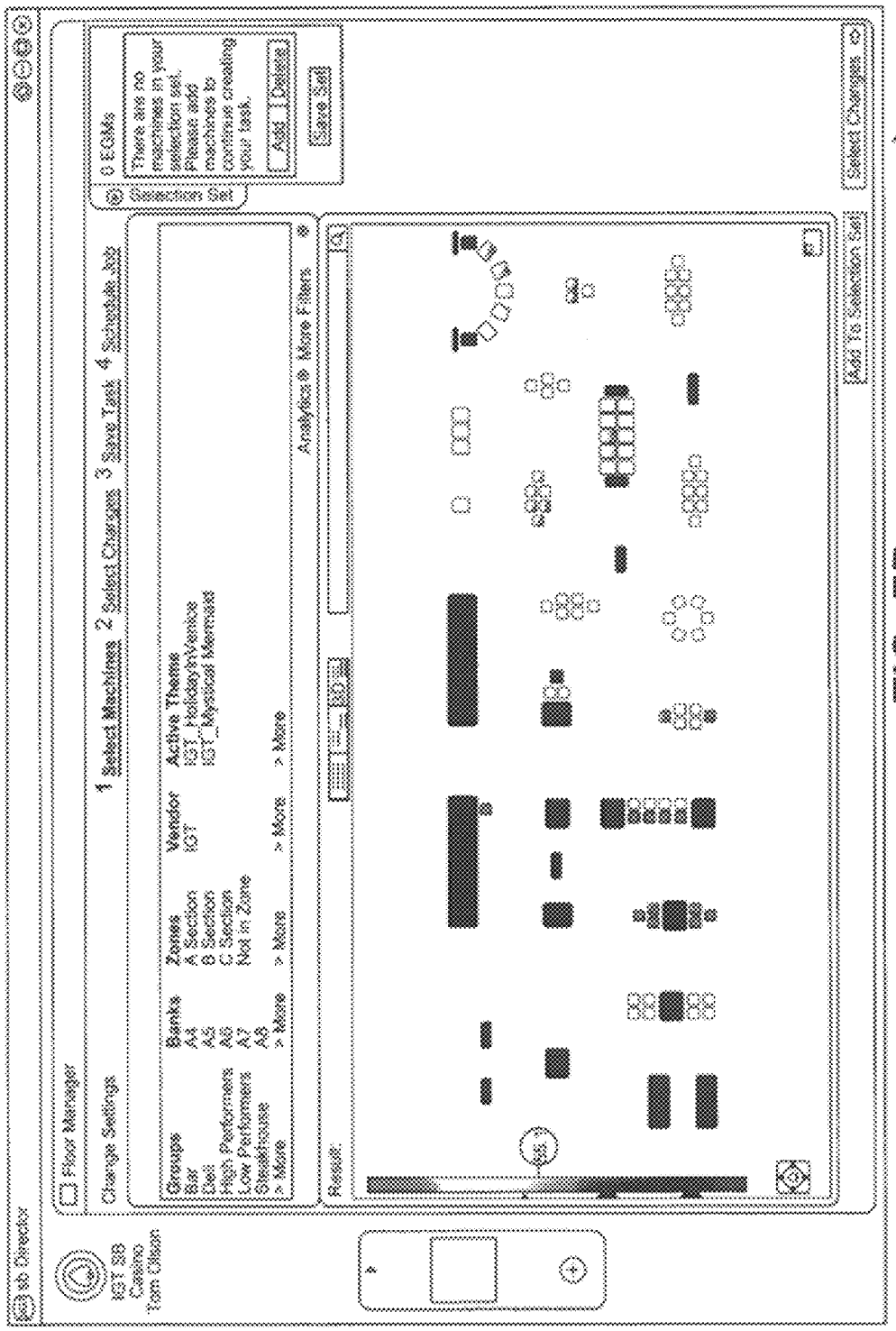

FIG. 7A illustrates a view of a casino floor 702, where each of the machines and tables is located within other casino infrastructure. This two dimensional plan view may be changed to a three dimensional view by pressing button 704. Colors representing high activity level or a high amount of a given metric may be displayed at the location of the machine/table, represented by the density of the pattern fill in FIG. 7B.

Although the foregoing invention has been described in some detail for purposes of clarity of understanding, it will be apparent that certain changes and modifications may be practiced within the scope of the appended claims.

We claim:

1. A casino management device, comprising: a group of one or more computers configured to:
   layout a floorplan of a casino gaming floor;
   create a respective gaming machine 3 dimensional model of each of at least two different types of casino gaming machines wherein one dimension of said 3 dimensional model represents gaming machine height;
   create at least one respective game table 3 dimensional model of one or more types of casino game tables wherein one dimension of said 3 dimensional model represents game table height;
   place the respective gaming machine 3 dimensional models of the casino gaming machines and the at least one respective 3 dimensional model of one or more types of casino game tables within the floorplan of the casino gaming floor;
   manipulate a simulated point of view of a patron such that the simulated point of view is at a viewing height less than a height of at least one gaming machine and the simulated point of view allows for line of sight view between the simulated viewpoint of a patron and at least one gaming machine or game table;
   render a 3 dimensional model of the floorplan with the gaming machines and game tables, as viewed from the simulated point of view, in two dimensions for a two dimensional display; and
   render, with the 3 dimensional model of the floorplan, an illustration of the casino gaming floor showing a graphical representation of a respective performance metric for each of a selection of gaming machines and game tables, each graphical representation displayed at the location of a physical gaming machine within the casino gaming floor.

2. The casino management device of claim 1, wherein the group of one or more computers is further configured to map a visual characteristic of the graphical representation of performance of a gaming machine or game table to a performance metric.

3. The casino management device of claim 2, wherein a mapped visual characteristic is a color and wherein the group of one or more computers is configured to map the color to a performance metric.

4. The casino management device of claim 2, wherein a mapped visual characteristic is a type of a 3D geometrical shape, and wherein the group of one or more computers is configured to map the type of a 3D geometrical shape to a performance metric.

5. The casino management device of claim 2, wherein a mapped visual characteristic is a width of a geometric shape, and wherein the group of one or more computers is configured to map the width of the geometric shape to a performance metric.

6. The casino management device of claim 2, wherein a mapped visual characteristic is a height of a geometric shape, and wherein the group of one or more computers is configured to map the height of the geometric shape to a performance metric.

7. The casino management device of claim 2, wherein a mapped visual characteristic is a transparency of a rendered geometric shape, and wherein the group of one or more computers is configured to map the transparency of the geometric shape to a performance metric.

8. The casino management device of claim 3, wherein the color is mapped to a base adjacent the 3D geometric shape.

9. The casino management device of claim 1, wherein the group of one or more computers is configured to receive a CAD file and to use the CAD file as a basis for the layout of the floorplan of the casino gaming floor.

10. The casino management device of claim 1, wherein the group of one or more computers is configured to allow a user to create a layout directly without first inputting a file created by another program.

11. The casino management device of claim 1, wherein the group of one or more computers is configured to render the model of the casino gaming floor showing the performance of a selection of correlated gaming machines and game tables such that the graphical representation of the performance is displayed at the location of the machine or table as a 3 dimensional shape rendered in two dimensions for a two dimensional display.

12. The casino management device of claim 1, wherein the group of one or more computers is configured to save performance metrics for the gaming machines and game tables at regular intervals, and to save iterations of the casino floor plan including the locations of the gaming machines and gaming tables.

13. The casino management device of claim 12, wherein the group of one or more computers is configured to track and compare the performance metrics of multiple iterations of the casino floor over time.

14. A method for optimizing the placement and productivity of wager based games, comprising:

creating a respective gaming machine 3 dimensional model of each of at least two different types of casino gaming machines or game tables wherein one dimension of said 3 dimensional model represents a respective height of the gaming machine or game table;

placing the 3 dimensional models of the casino gaming machines and game tables within a layout of the casino gaming floor;

manipulating a simulated point of view of a patron such that the simulated point of view is at a viewing height less than a height of at least one gaming machine and the simulated point of view allows for line of sight view between the simulated viewpoint of a patron and at least one gaming machine or game table;

rendering a 3 dimensional model of the layout with the gaming machines and game tables, as viewed from the simulated point of view, in two dimensions for a two dimensional display; and rendering, with the 3 dimensional model of the floorplan, an illustration of the casino gaming floor showing a graphical representation of a respective performance metric for each of a selection of gaming machines and game tables, each graphical representation displayed at the location of a physical gaming machine within the casino gaming floor.

* * * * *